United States Patent
Kim et al.

(10) Patent No.: US 12,110,061 B2
(45) Date of Patent: Oct. 8, 2024

(54) HOOD CABLE FIXING CASE FOR VEHICLE

(71) Applicants: Hyundai Motor Company, Seoul (KR); Kia Corporation, Seoul (KR)

(72) Inventors: Eun Min Kim, Busan (KR); Sang IL Lee, Anyang-si (KR); Hoosang Park, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 448 days.

(21) Appl. No.: 17/537,857

(22) Filed: Nov. 30, 2021

(65) Prior Publication Data
US 2022/0297763 A1     Sep. 22, 2022

(30) Foreign Application Priority Data
Mar. 19, 2021  (KR) .......................... 10-2021-0035820

(51) Int. Cl.
*B62D 25/12*     (2006.01)
*B60R 11/00*     (2006.01)

(52) U.S. Cl.
CPC ...... *B62D 25/12* (2013.01); *B60R 2011/0071* (2013.01)

(58) Field of Classification Search
CPC ............ B62D 25/12; B60R 2011/0071; B60R 16/0215; B60R 16/02; B60R 16/0207; H02G 3/081; H02G 3/086; H02G 3/14; H02G 3/16; F16G 11/00; B60Y 2304/07
See application file for complete search history.

(56) References Cited

U.S. PATENT DOCUMENTS 5,684,274 A * 11/1997 McLeod .................. H01R 4/70
                                                  174/92
5,962,814 A * 10/1999 Skipworth .......... B60R 16/0215
                                                  174/136
(Continued)

FOREIGN PATENT DOCUMENTS

CN         1893211 A  *  1/2007  ......... B60R 16/0215
CN       107826058 B  *  7/2019  ......... B60R 16/0214
(Continued)

OTHER PUBLICATIONS

Translated JP-2010133543-A (Year: 2024).*
Translated KR-100205899-B1 (Year: 2024).*

*Primary Examiner* — James A Shriver, II
*Assistant Examiner* — Ian Bryce Shelton
(74) *Attorney, Agent, or Firm* — Slater Matsil, LLP (57) ABSTRACT

An embodiment hood cable fixing casing for a vehicle includes a body part configured to be fixed to a vehicle body so that a first surface thereof faces the vehicle body and a cover part provided on the body part and configured to be hingedly rotated and cover the body part, wherein the cover part comprises cable insertion guide portions hingedly coupled to the body part and configured to define an opening with cable insertion portions and to guide insertion of a hood cable while hingedly rotating. An embodiment body part includes clip portions protruding outward from the first surface of the body part and configured to be inserted and fixed into the vehicle body, and cable insertion portions provided at two opposite sides of the first surface of the body part and configured to receive the hood cable therein.

20 Claims, 12 Drawing Sheets

(56) References Cited

U.S. PATENT DOCUMENTS

| | | | | |
|---|---|---|---|---|
| 6,126,123 | A * | 10/2000 | Yang | B60R 16/0215 248/74.1 |
| 6,234,429 | B1 * | 5/2001 | Yang | B60R 16/0215 248/68.1 |
| 6,483,032 | B2 * | 11/2002 | Adams | H02G 3/086 174/67 |
| 7,906,728 | B2 * | 3/2011 | Sakata | B60R 16/0215 174/72 A |
| 10,451,103 | B2 * | 10/2019 | Yoshida | F16C 1/101 |
| 2001/0037891 | A1 * | 11/2001 | Adams | H02G 3/086 174/50 |
| 2003/0173102 | A1 * | 9/2003 | Kishizawa | H02G 3/0481 174/68.1 |
| 2008/0169667 | A1 * | 7/2008 | Siniarski | B60R 7/082 296/37.8 |
| 2010/0230157 | A1 * | 9/2010 | Sakata | B60R 16/0215 174/72 A |
| 2013/0140410 | A1 * | 6/2013 | Lee | F16C 1/105 248/74.2 |
| 2019/0351846 | A1 * | 11/2019 | Matsuyama | B60R 16/0215 |
| 2020/0099211 | A1 * | 3/2020 | Kawaguchi | F16B 2/10 |
| 2021/0021113 | A1 * | 1/2021 | Schmidt | F16L 3/1075 |
| 2023/0378735 | A1 * | 11/2023 | Tanaka | B60R 16/02 |

FOREIGN PATENT DOCUMENTS

| | | | | |
|---|---|---|---|---|
| CN | 109312586 | B * | 6/2020 | E05D 1/02 |
| DE | 102006017878 | A1 * | 10/2007 | B60R 11/00 |
| EP | 1308589 | B1 * | 7/2007 | B62D 25/12 |
| GB | 2202692 | A * | 9/1988 | H01R 3/5213 |
| JP | H10134879 | A * | 5/1998 | |
| JP | 2006006087 | A * | 1/2006 | B60R 16/0215 |
| JP | 2010133543 | A * | 6/2010 | F16L 3/1075 |
| JP | 2012028072 | A * | 2/2012 | |
| JP | 2014003779 | A * | 1/2014 | |
| KR | 19980051964 | U * | 10/1998 | |
| KR | 19990040725 | A * | 6/1999 | |
| KR | 100205898 | B1 * | 7/1999 | |
| KR | 100205899 | B1 * | 7/1999 | |
| KR | 101463167 | B1 * | 11/2014 | |
| KR | 20170061840 | A * | 6/2017 | |
| KR | 20180045540 | A * | 5/2018 | |
| KR | 20200134366 | A | 12/2020 | |
| WO | WO-2007132545 | A1 * | 11/2007 | B60R 16/0215 |

* cited by examiner

HOOD CABLE FIXING CASE FOR VEHICLE

CROSS-REFERENCE TO RELATED APPLICATIONS

This application claims the benefit of Korean Patent Application No. 10-2021-0035820, filed on Mar. 19, 2021, which application is hereby incorporated herein by reference.

TECHNICAL FIELD

The present invention relates to a hood cable casing for a vehicle.

BACKGROUND

In general, a cover for a vehicle engine, i.e., a bonnet is called a hood. A mounting bracket is mounted in the hood and serves to fix a hood cable that connects a driver seat side cable and a front end module (FEM) side cable.

Figure 1:
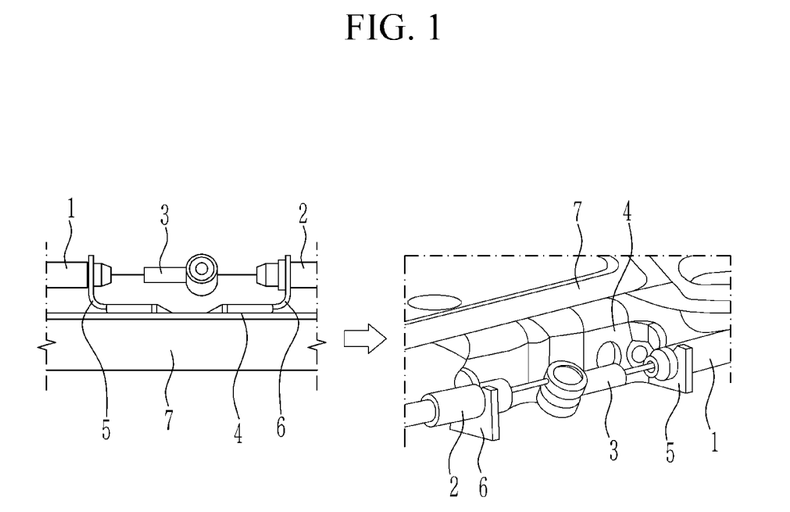
FIG. 1 is a view illustrating a state in which a hood cable is fixed to a mounting bracket in the related art.

As illustrated in FIG. 1, the hood cable includes a fixing part 4 having two opposite sides at which an FEM side cable 1 and a driver seat side cable 2 are connected with a T-connection part 3, the fixing part 4 having a mounting bracket fixed to a vehicle body, and cable insertion parts 5 and 6 into which the FEM side cable 1 and the driver seat side cable 2 are respectively inserted.

However, the hood cable may be separated while a vehicle travels in a defectively assembled state in which the hood cable is not actually and accurately fixed to the cable insertion parts 5 and 6 even though the hood cable appears to be normally assembled with the mounting bracket when the hood cable is checked with the naked eye. For this reason, there may occur a dangerous situation in which the hood cannot be opened.

In addition, because the mounting bracket is mainly made of steel, the mounting bracket may have a defect due to a burr of a mold during a process of manufacturing the mounting bracket, which makes it difficult to insert the hood cable into the mounting bracket.

The above information disclosed in this Background section is only for enhancement of understanding of the background of the invention, and therefore it may contain information that does not form the prior art that is already known to a person of ordinary skill in the art.

SUMMARY

The present invention relates to a hood cable casing for a vehicle. Particular embodiments relate to a hood cable fixing casing for a vehicle, the hood cable fixing casing being configured to fix a hood cable that connects a driver seat side cable and a front end module (FEM) side cable to a vehicle body.

Embodiments of the present invention provide a hood cable fixing casing for a vehicle that is capable of preventing the separation of a hood cable by applying a simple assembly structure.

An exemplary embodiment of the present invention provides a hood cable fixing casing for a vehicle, the hood cable fixing casing being configured to fix a hood cable therein and including a body part fixed to a vehicle body so that one surface thereof faces the vehicle body, and a cover part provided on the body part so as to be hingedly rotated and configured to cover the body part. The body part include: clip portions protruding outward from one surface of the body part and configured to be inserted and fixed into the vehicle body, and cable insertion portions provided at two opposite sides of one surface of the body part and configured to allow the hood cable to be inserted thereinto, and the cover part includes cable insertion guide portions hingedly coupled to the body part and configured to define an opening with the cable insertion portions and guide insertion of the hood cable while hingedly rotating.

The body part may further include protrusion portions disposed at positions corresponding to the clip portions, protruding inward from one surface of the body part, and configured to support the hood cable.

The body part may include the other surface extending to be perpendicular to one surface toward a side opposite to the vehicle body, and the cable insertion portions may be disposed between one surface and the other surface and provided in a direction perpendicular to one surface and the other surface.

The cover part may include one surface connected to the other surface of the body part, the other surface extending to be perpendicular to one surface of the cover part, and the cable insertion guide portions may be disposed between one surface and the other surface and provided in a direction perpendicular to one surface and the other surface.

One side of the cable insertion guide portion and one side of the cable insertion portion may be hingedly coupled to each other, such that the cover part may be hingedly rotated relative to the body part.

A cover hook portion may be provided at one end of the other surface of the cover part, and the cover hook portion may engage with a hook catching projection provided at one end of one surface of the body part by the hinged rotation of the cover part.

The cover hook portion may be provided in plural, and the other surface of the cover part between the plurality of cover hook portions may be spaced apart from one surface of the body part at a predetermined interval when the cover part and the body part are coupled to each other.

The clip portion may include a hollow guide pin having a slit formed in a longitudinal direction thereof, and a clip hook extending in the longitudinal direction of the clip portion along the slit and configured to allow the body part to engage with the vehicle body.

The protrusion portion may integrally extend from the clip portion toward the inside of the body part, and one end of the clip hook may be disposed inside the body part and integrally coupled to the protrusion portion.

The protrusion portion may have a slit extending from the slit formed in the clip portion.

The clip hook may move rearward or forward toward the slits of the clip portion and the protrusion portion based on an end integrally coupled to the protrusion portion.

One surface of the body part, on which the clip hook is formed, may have an opening space in which the clip hook is movable.

According to embodiments of the present invention, since the assembly direction of the hood cable is coincident with the direction of the load applied by the operator, the assembly properties may be improved.

In addition, a hood cable overlap section is excluded, and a bracket thickness is optimized, such that a force of inserting the cable may be minimized.

In addition, the normally assembled state of the cover hook portions may be checked, and the normally assembled state of the hood cable may be checked, which makes it possible to prevent the cable from being abnormally assembled.

In addition, the hook engagement between the cover hook portions and the hook catching projections generates the clicking sound at the time of assembling the casing cover, which makes it possible to allow the assembler to recognize the assembled state.

In addition, the shape of the body part improves related A/S performance such as the replacement of the cable.

The following elements may be used in connection with the drawings to describe embodiments of the present invention.

| | |
|---|---|
| 100: Hood cable fixing casing for vehicle | |
| 1: FEM side cable | 2: Driver seat side cable |
| 3: T-connection part | 4: Fixing part |
| 5, 6: Cable insertion portion | 7: Vehicle body |
| 10: Body part | 11: Guide pin |
| 12: Clip portion | 13: Clip hook |
| 14: Protrusion portion | 16: Cable insertion portion |
| 18: Hook catching projection | 20: Cover part |
| 22: Cover hook portion | 24: Cable insertion guide portion |

DETAILED DESCRIPTION OF ILLUSTRATIVE EMBODIMENTS

Hereinafter, embodiments of the present invention will be described in detail with reference to the accompanying drawings so that those with ordinary skill in the art to which the present invention pertains may easily carry out the embodiments. The present invention may be implemented in various different ways and is not limited to the embodiments described herein.

In addition, the constituent elements having the same configurations in the several embodiments will be assigned with the same reference numerals and described only in the representative embodiment, and only the constituent elements, which are different from the constituent elements according to the representative embodiment, will be described in other embodiments.

It is noted that the drawings are schematic and are not illustrated based on actual scales. Relative dimensions and proportions of parts illustrated in the drawings are exaggerated or reduced in size for the purpose of clarity and convenience in the drawings, and any dimension is just illustrative but not restrictive. The same reference numerals designate the same structures, elements or components illustrated in two or more drawings in order to exhibit similar characteristics. When one component is described as being positioned "above" or "on" another component, one component can be positioned "directly on" another component, and one component can also be positioned on another component with other components interposed therebetween.

An embodiment of the present invention specifically illustrates an example of the present invention. As a result, various modifications of the drawings are expected. Therefore, the embodiments are not limited to specific forms in regions illustrated in the drawings, and for example, include modifications of forms by the manufacture thereof.

Hereinafter, a hood cable fixing casing for a vehicle according to an embodiment of the present invention will be described with reference to FIGS. 2 and 3.

Figure 2:
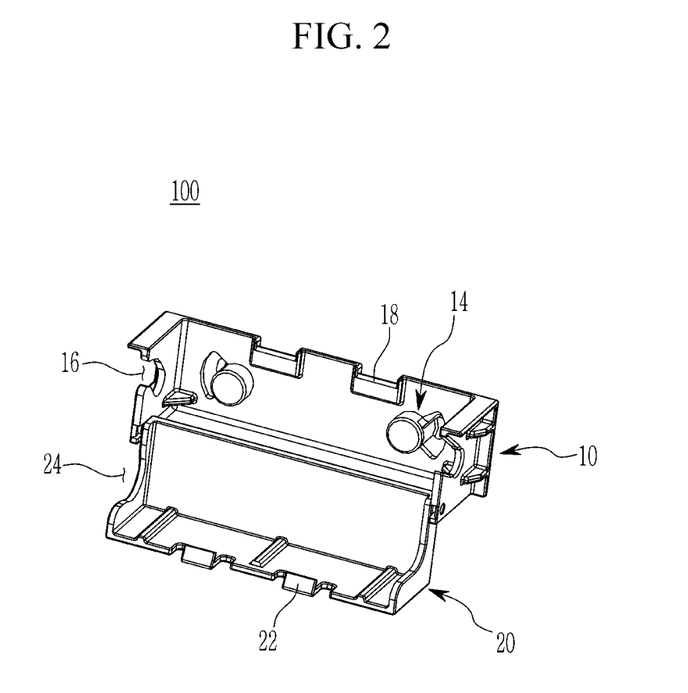
FIG. 2 is a perspective view illustrating a hood cable fixing casing for a vehicle according to an embodiment of the present invention when viewed from one side.
Figure 3:
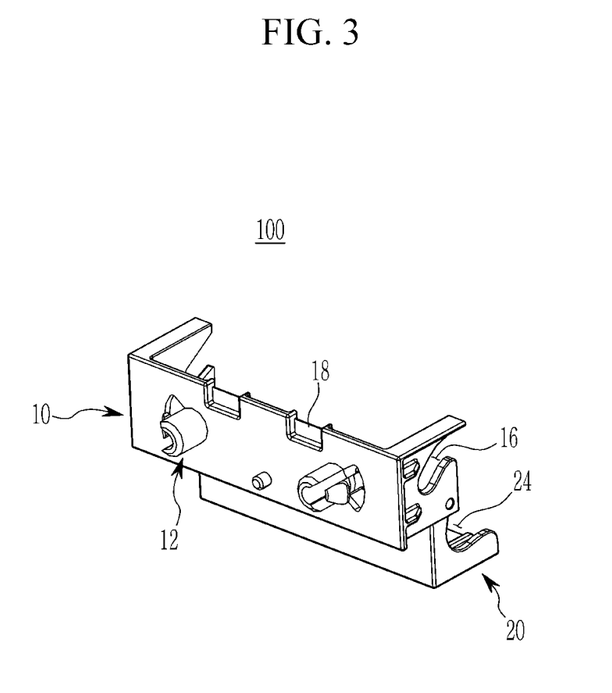
FIG. 3 is a perspective view illustrating the hood cable fixing casing for a vehicle according to an embodiment of the present invention when viewed from another side.

FIG. 2 is a perspective view illustrating a hood cable fixing casing for a vehicle according to an embodiment of the present invention when viewed from one side, and FIG. 3 is a perspective view illustrating the hood cable fixing casing for a vehicle according to the embodiment of the present invention when viewed from another side.

As illustrated in FIGS. 2 and 3, a hood cable fixing casing 100 for a vehicle according to an embodiment of the present invention includes a body part 10 and a cover part 20. The body part 10 is fixed to a vehicle body 7 so that one surface thereof faces the vehicle body 7. The cover part 20 is configured to be rotated by being hingedly coupled to the body part 10 and may cover the body part 10.

The body part 10 may include one surface and the other surface which are bent at a right angle. That is, the body part 10 includes the other surface extending perpendicularly from one surface toward a side opposite to the vehicle body 7. In addition, the body part 10 includes cable insertion portions 16 provided between one surface and the other surface of the body part 10 and disposed to be perpendicular to one surface and the other surface of the body part 10. The cable insertion portions 16 may be disposed at two opposite sides of the body part 10 and face each other. Hood cables 1, 2, and 3 may be disposed across the body part 10 and inserted into the cable insertion portions 16.

The cover part 20 may also include one surface and the other surface which are bent at a right angle. That is, the cover part 20 includes one surface connected to the other surface of the body part 10, and the other surface extending to be perpendicular to one surface. In addition, the cover part 20 includes cable insertion guide portions 24 provided between one surface and the other surface of the cover part 20 and disposed to be perpendicular to one surface and the other surface of the cover part 20. The cable insertion guide portions 24 may be hingedly coupled to the cable insertion portions 16 of the body part 10 and hingedly rotated to define openings between the cable insertion guide portions 24 and the cable insertion portions 16 and guide the insertion of the hood cables 1, 2, and 3.

Meanwhile, the body part 10 includes clip portions 12 and protrusion portions 14. The clip portion 12 may protrude outward from one surface of the body part 10 and be inserted and fixed into the vehicle body 7. The clip portion 12 may be provided in plural. In addition, the protrusion portion 14 is disposed at a position corresponding to the clip portion 12 with one surface of the body part 10 interposed therebetween and protrudes inward from one surface of the body part 10. The protrusion portion 14 may serve to support the hood cables 1, 2, and 3 inside the body part 10.

Meanwhile, cover hook portions 22 may be provided at one end of the other surface of the cover part 20. In addition, hook catching projections 18 may be provided at one end of one surface of the body part 10. When the cover part 20 hingedly rotates and covers the body part 10, the cover hook portions 22 may engage with the hook catching projections 18. To this end, the cover hook portion 22 may protrude toward the inside of the cover part 20, and the hook catching projection 18 may be recessed inward from one surface of the body part 10.

Figure 4:
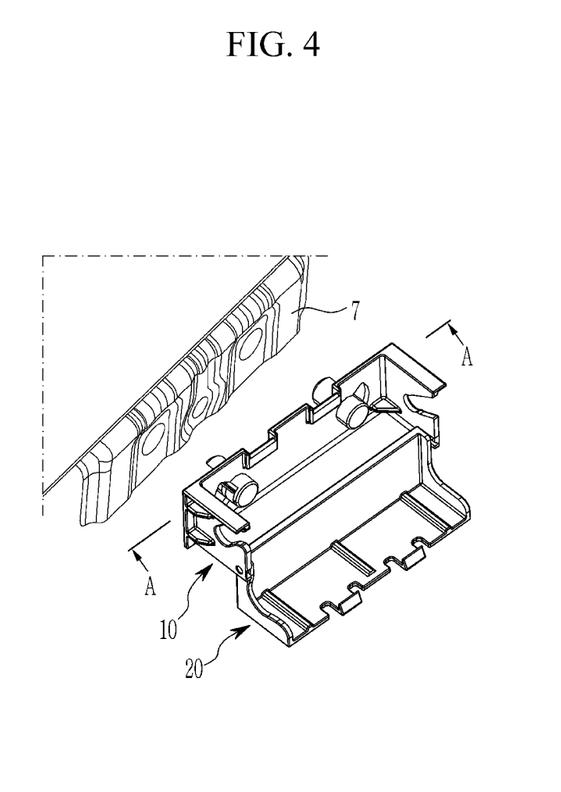
FIG. 4 is a view illustrating a state in which the hood cable fixing casing for a vehicle according to an embodiment of the present invention is fixed to a vehicle body.
Figure 5:
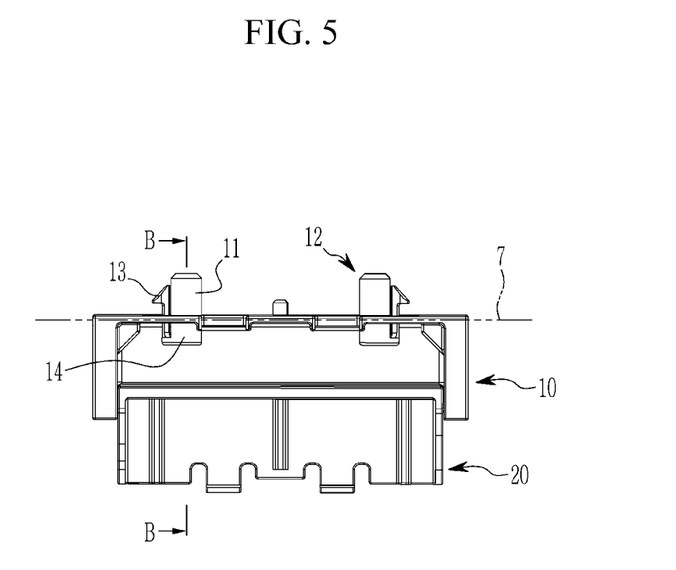
FIG. 5 is a view taken along line 'A-A' in FIG. 4.
Figure 6:
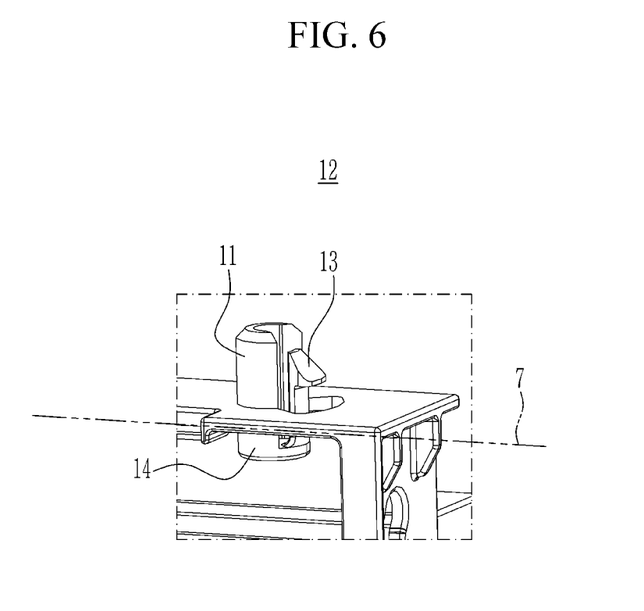
FIG. 6 is a view taken along line 'B-B' in FIG. 5.

FIG. 4 is a view illustrating a state in which the hood cable fixing casing for a vehicle according to an embodiment of the present invention is fixed to a vehicle body, FIG. 5 is a view taken along line 'A-A' in FIG. 4, and FIG. 6 is a view taken along line 'B-B' in FIG. 5.

Referring to FIGS. 4 to 6, according to the hood cable fixing casing 100 for a vehicle according to an embodiment of the present invention, the body part 10 is disposed to face the vehicle body 7, and the clip portions 12 disposed on the body part 10 are inserted and fixed into openings formed in the vehicle body 7. The clip portion 12 may be provided in plural, and the plurality of openings, which is equal in number to the clip portions 12, may be provided in the vehicle body 7.

The clip portion 12 may include a guide pin 11 and a clip hook 13. The guide pin 11 may have a hollow shape having a slit formed in a longitudinal direction. The clip hook 13 extends along the slit in the longitudinal direction of the clip portion 12. The clip hook 13 has a protruding portion, such that the clip hook 13 may be fixed by engaging with the vehicle body 7 by being inserted into the opening of the vehicle body 7. In addition, an end of the guide pin 11 may have a tapered shape so that the guide pin 11 may be smoothly inserted into the opening of the vehicle body 7.

Meanwhile, the protrusion portion 14 may integrally extend from the clip portion 12 toward the inside of the body part 10. One end of the clip hook 13 may be disposed in the body part 10 and integrally coupled to the protrusion portion 14. The protrusion portion 14 may also have a slit extending from the slit of the clip portion 12. The clip portion 12 and the protrusion portion 14 may be integrated with one surface of the body part 10 interposed therebetween.

In addition, the clip hook 13 may move rearward or forward toward the slit based on one end of the clip hook 13 integrally coupled to the protrusion portion 14. To allow the clip hook 13 to move forward or rearward, one surface of the body part 10 may have an opening space in which the clip hook 13 may move. Since the clip hook 13 may move rearward or forward toward the slit, an insertion force is improved, and the body part 10 may be easily fixed to the vehicle body 7. In addition, as the clip hook 13 is pushed toward the guide pin 11 through the opening space, the body part 10 may be easily detached from the vehicle body 7.

Figure 7:
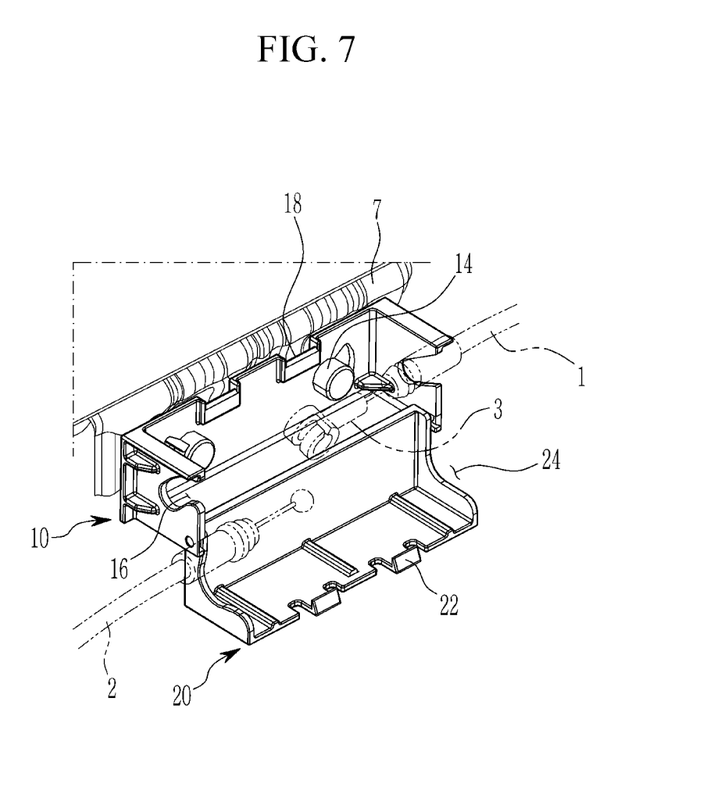
FIG. 7 is a perspective view illustrating a state in which the hood cable fixing casing for a vehicle according to an embodiment of the present invention is fixed to the vehicle body and a hood cable is inserted into the casing.

FIG. 7 is a perspective view illustrating a state in which the hood cable fixing casing for a vehicle according to an embodiment of the present invention is fixed to the vehicle body and the hood cable is inserted into the casing, and FIGS. 8A to 8D are views illustrating a process of inserting the hood cable into the hood cable fixing casing for a vehicle according to an embodiment of the present invention.

Referring to FIGS. 7 and 8A to 8D, the hood cable fixing casing 100 for a vehicle is fixed to the vehicle body 7 first so that one surface of the body part 10 of the casing 100 faces the vehicle body 7. The guide pin 11 and the clip hook 13 of the clip portion 12 formed on the body part 10 are inserted into the opening formed in the vehicle body 7, and the clip hook 13 may be fixed by engaging with the opening.

Figure 8A:
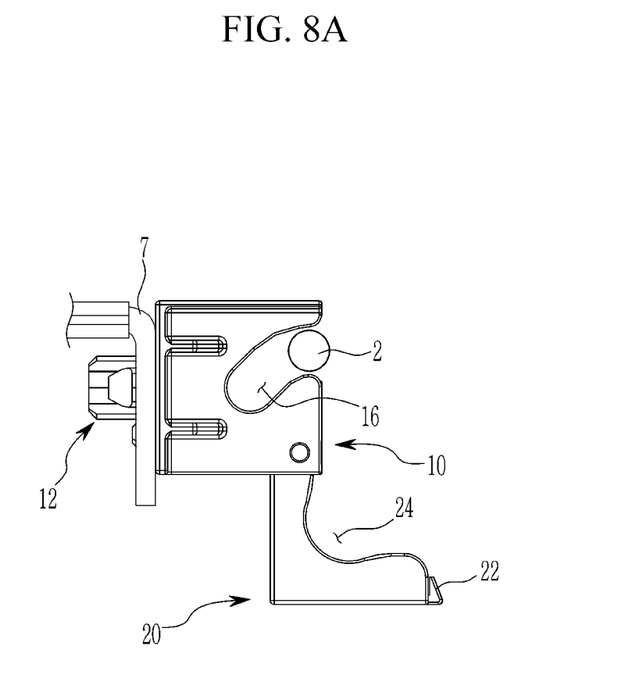
FIGS. 8A to 8D are views illustrating a process of inserting the hood cable into the hood cable fixing casing for a vehicle according to an embodiment of the present invention.
Figure 8B:
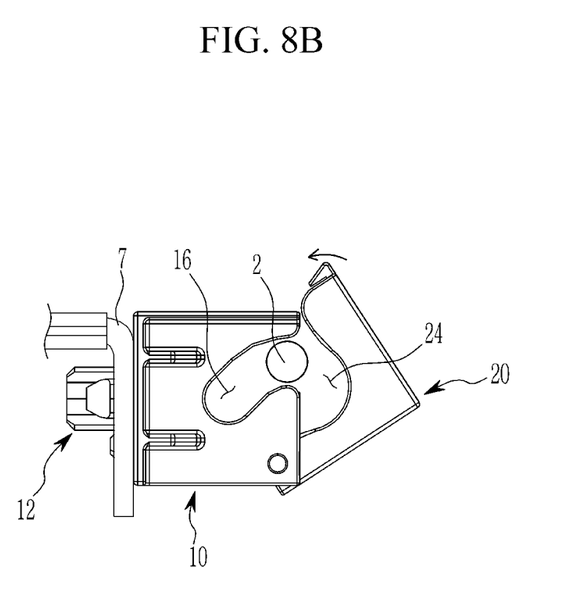

In the state in which the cover part 20 is hingedly rotated from the body part 10 and opened, an assembler may insert the hood cable 2 into the cable insertion portions 16 formed in the body part 10 (FIG. 8A). The cable insertion portions 16 may each be provided in the form of a slit inclined in a gravitational direction so that the hood cable 2 is naturally pushed and seated by the contact with the cable insertion guide portions 24 of the cover part 20 after being inserted into the cable insertion portions 16. In addition, the cable insertion portions 16 may each be provided in the form of a slit opened toward the assembler in a direction coincident with a direction in which the assembler applies a load to the hood cable 2 and pushes the hood cable 2. Since the direction of the slit enables the assembler to easily push the hood cable 2 toward the vehicle body 7, the assembly properties may be improved.

Figure 8C:
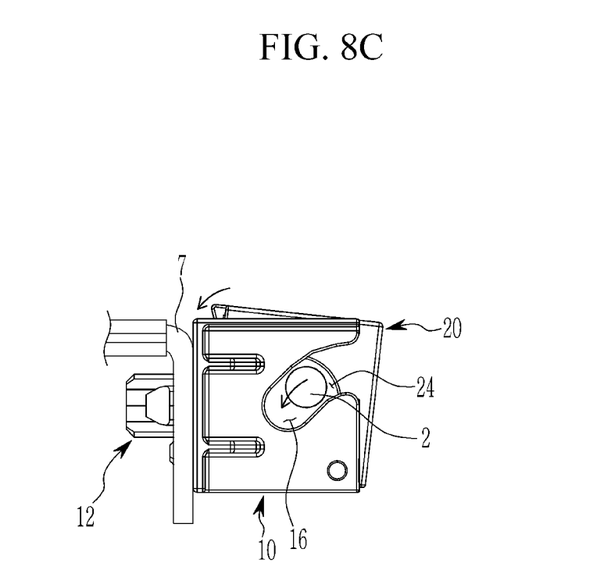

Thereafter, when the cover part 20 is hingedly rotated, the cable insertion guide portions 24 gradually become close to a lateral side of the hood cable 2 (FIG. 8B), and the cable insertion guide portions 24 come into contact with the lateral side of the hood cable 2 and push the hood cable 2 toward the inside of the cable insertion portions 16 and the vehicle body 7 (FIG. 8C).

Figure 8D:
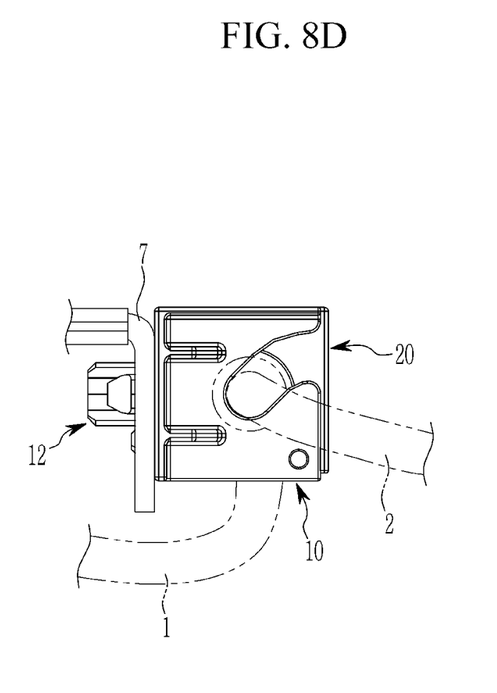

Thereafter, the cover hook portions 22 formed at one end of the other surface of the cover part 20 engage with the hook catching projections 18 provided at one end of one surface of the body part 10 with a clicking sound (FIG. 8D). Then, the hook engagement allows the cover part 20 to completely cover the body part 10, and the hood cable 2 is finally inserted into the opening formed between the cover part 20 and the body part 10. The assembler may check whether the assembly is completed by recognizing the sound generated by the hook engagement between the cover hook portions 22 and the hook catching projections 18.

Figure 9:
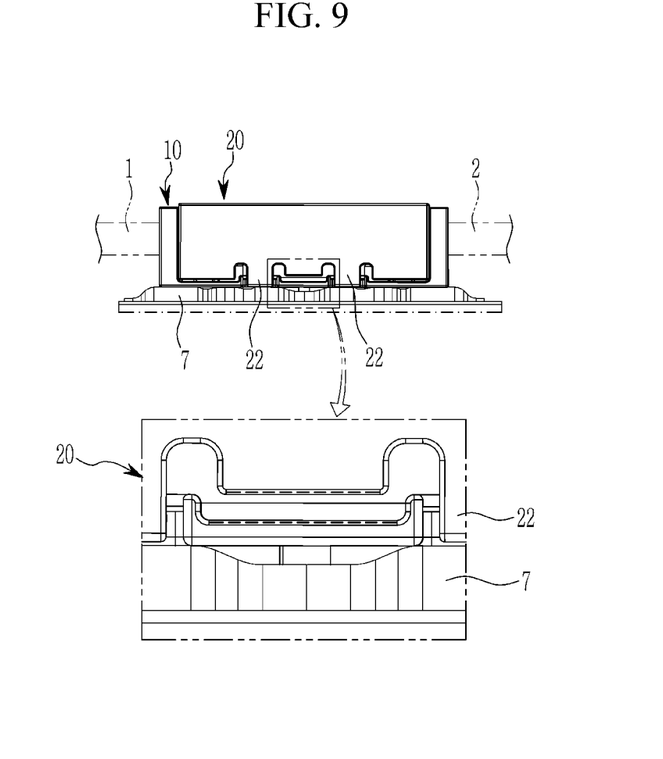
FIG. 9 is a view illustrating a state in which the hood cable fixing casing for a vehicle according to an embodiment of the present invention is fixed to the vehicle body when viewed from above.

FIG. 9 is a view illustrating a state in which the hood cable fixing casing for a vehicle according to an embodiment of the present invention is fixed to the vehicle body when viewed from above.

Referring to FIG. 9, the cover hook portion 22 formed at one end of the cover part 20 may be provided in plural, and the other surface of the cover part 20 between the plurality of cover hook portions 22 may be recessed to be spaced apart from one surface of the body part 10 at a predetermined interval when the cover part 20 and the body part 10 are coupled to each other. A rod-shaped tool such as a screwdriver is inserted into the spacing space with the predetermined interval and rotates the other surface of the cover part 20 from inside to outside based on the principle of a lever, such that the cover hook portions 22 may be separated from the hook catching projections 18, and the cover part 20 may be easily detached from the body part 10.

According to embodiments of the present invention described above, since the assembly direction of the hood cable is coincident with the direction of the load applied by the operator, the assembly properties may be improved.

In addition, a hood cable overlap section is excluded, and a bracket thickness is optimized, such that a force of inserting the cable may be minimized.

In addition, the normally assembled state of the cover hook portions may be checked, and the normally assembled state of the hood cable may be checked, which makes it possible to prevent the cable from being abnormally assembled.

In addition, the hook engagement between the cover hook portions and the hook catching projections generates the clicking sound at the time of assembling the casing cover, which makes it possible to allow the assembler to recognize the assembled state.

In addition, the shape of the body part improves related A/S performance such as the replacement of the cable.

While the exemplary embodiments of the present invention have been described, the present invention is not limited to the embodiments. The present invention covers all modifications that can be easily made from the embodiments of the present invention by those skilled in the art and considered as being equivalent to the present invention.

What is claimed is:

1. A hood cable fixing casing for a vehicle, the hood cable fixing casing comprising:
a body part configured to be fixed to a vehicle body so that a first surface thereof faces the vehicle body, the body part comprising:
clip portions protruding outward from the first surface of the body part and configured to be inserted and fixed into the vehicle body, wherein each of the clip portions comprises a hollow guide pin having a slit formed in a longitudinal direction of the clip portion; and
cable insertion portions provided at two opposite sides of the first surface of the body part and configured to receive a hood cable therein; and
a cover part provided on the body part and configured to be hingedly rotated and cover the body part, wherein the cover part comprises cable insertion guide portions hingedly coupled to the body part and configured to define an opening with the cable insertion portions and to guide insertion of the hood cable while hingedly rotating.

2. The hood cable fixing casing of claim 1, wherein the body part further comprises protrusion portions disposed at positions corresponding to the clip portions, protruding inward from the first surface of the body part, and configured to support the hood cable.

3. The hood cable fixing casing of claim 1, wherein:
the body part comprises a second surface extending to be perpendicular to the first surface toward a side opposite the vehicle body; and
the cable insertion portions are disposed between the first surface and the second surface and are provided in a direction perpendicular to the first surface and the second surface.

4. The hood cable fixing casing of claim 3, wherein:
the cover part comprises a third surface connected to the second surface of the body part and a fourth surface extending to be perpendicular to the third surface of the cover part; and
the cable insertion guide portions are disposed between the third surface and the fourth surface and are provided in a direction perpendicular to the third surface and the fourth surface.

5. The hood cable fixing casing of claim 4, wherein a first side of one of the cable insertion guide portions and a first side of one of the cable insertion portions are hingedly coupled to each other, such that the cover part is configured to be hingedly rotated relative to the body part.

6. The hood cable fixing casing of claim 5, wherein:
a cover hook portion is provided at one end of the fourth surface of the cover part; and
the cover hook portion is configured to engage with a hook catching projection provided at one end of the first surface of the body part by the hinged rotation of the cover part.

7. The hood cable fixing casing of claim 6, wherein:
the cover hook portion is provided in plural; and
the fourth surface of the cover part between the plurality of cover hook portions is spaced apart from the first surface of the body part at a predetermined interval in a state in which the cover part and the body part are coupled to each other.

8. A hood cable fixing casing for a vehicle, the hood cable fixing casing comprising:
a body part configured to be fixed to a vehicle body so that a first surface thereof faces the vehicle body, the body part comprising:
clip portions protruding outward from the first surface of the body part and configured to be inserted and fixed into the vehicle body, wherein each of the clip portions comprises a hollow guide pin having a slit formed in a longitudinal direction of the clip portion and a clip hook extending in the longitudinal direction of the clip portion along the slit and configured to allow the body part to engage with the vehicle body;
cable insertion portions provided at two opposite sides of the first surface of the body part and configured to receive a hood cable therein; and
protrusion portions disposed at positions corresponding to the clip portions, protruding inward from the first surface of the body part, and configured to support the hood cable; and
a cover part provided on the body part and configured to be hingedly rotated and cover the body part, wherein the cover part comprises cable insertion guide portions hingedly coupled to the body part and configured to define an opening with the cable insertion portions and to guide insertion of the hood cable while hingedly rotating.

9. The hood cable fixing casing of claim 8, wherein the protrusion portion integrally extends from the clip portion toward an inside of the body part, and a first end of the clip hook is disposed inside the body part and integrally coupled to the protrusion portion.

10. The hood cable fixing casing of claim 9, wherein the protrusion portion has a slit extending from the slit formed in the clip portion.

11. The hood cable fixing casing of claim 10, wherein the clip hook is configured to move rearward or forward toward the slit of the clip portion and the slit of the protrusion portion based on an end integrally coupled to the protrusion portion.

12. The hood cable fixing casing of claim 11, wherein the first surface of the body part on which the clip hook is formed has an opening space in which the clip hook is configured to be movable.

13. A vehicle comprising:
a vehicle body;
a body part fixed to the vehicle body with a first surface thereof facing the vehicle body, the body part comprising:
clip portions protruding outward from the first surface of the body part and inserted and fixed into openings in the vehicle body; and cable insertion portions provided at two opposite sides of the first surface of the body part and configured to receive a hood cable therein;

a hood cable disposed in the body part; and a cover part provided on the body part and configured to be hingedly rotated and cover the body part, wherein the cover part comprises cable insertion guide portions hingedly coupled to the body part and configured to define an opening with the cable insertion portions and to guide insertion of the hood cable while hingedly rotating;

wherein the body part further comprises protrusion portions disposed at positions corresponding to the clip portions, protruding inward from the first surface of the body part, and configured to support the hood cable; and wherein each of the clip portions comprises:
- a hollow guide pin having a slit formed in a longitudinal direction of the clip portion; and
- a clip hook extending in the longitudinal direction of the clip portion along the slit and configured to allow the body part to engage with the vehicle body.

14. The vehicle of claim 13, wherein:

the protrusion portion integrally extends from the clip portion toward an inside of the body part;

a first end of the clip hook is disposed inside the body part and integrally coupled to the protrusion portion;

the protrusion portion has a slit extending from the slit formed in the clip portion;

the clip hook is configured to move rearward or forward toward the slit of the clip portion and the slit of the protrusion portion based on an end integrally coupled to the protrusion portion; and the first surface of the body part on which the clip hook is formed has an opening space in which the clip hook is configured to be movable.

15. The vehicle of claim 13, wherein:

the body part comprises a second surface extending to be perpendicular to the first surface toward a side opposite the vehicle body;

the cover part comprises a third surface connected to the second surface of the body part and a fourth surface extending to be perpendicular to the third surface of the cover part; and the cable insertion guide portions are disposed between the first surface and the second surface and are provided in a direction perpendicular to the first surface and the second surface and are disposed between the third surface and the fourth surface and are provided in a direction perpendicular to the third surface and the fourth surface.

16. The vehicle of claim 15, wherein a first side of one of the cable insertion guide portions and a first side of one of the cable insertion portions are hingedly coupled to each other, such that the cover part is configured to be hingedly rotated relative to the body part.

17. The vehicle of claim 16, wherein:

a cover hook portion is provided at one end of the fourth surface of the cover part; and the cover hook portion is configured to engage with a hook catching projection provided at one end of the first surface of the body part by the hinged rotation of the cover part.

18. The vehicle of claim 17, wherein:

the cover hook portion is provided in plural; and the fourth surface of the cover part between the plurality of cover hook portions is spaced apart from the first surface of the body part at a predetermined interval in a state in which the cover part and the body part are coupled to each other.

19. The hood cable fixing casing of claim 1, wherein the body part further comprises protrusion portions disposed at positions corresponding to the clip portions, the protrusions protruding inward from the first surface of the body part.

20. The hood cable fixing casing of claim 1, wherein the body part further comprises protrusion portions disposed at positions corresponding to the clip portions, the protrusions configured to support the hood cable.

* * * * *